W. B. GEDDES.
Stove and Furnace Grate.
No. 202,102.      Patented April 9, 1878.
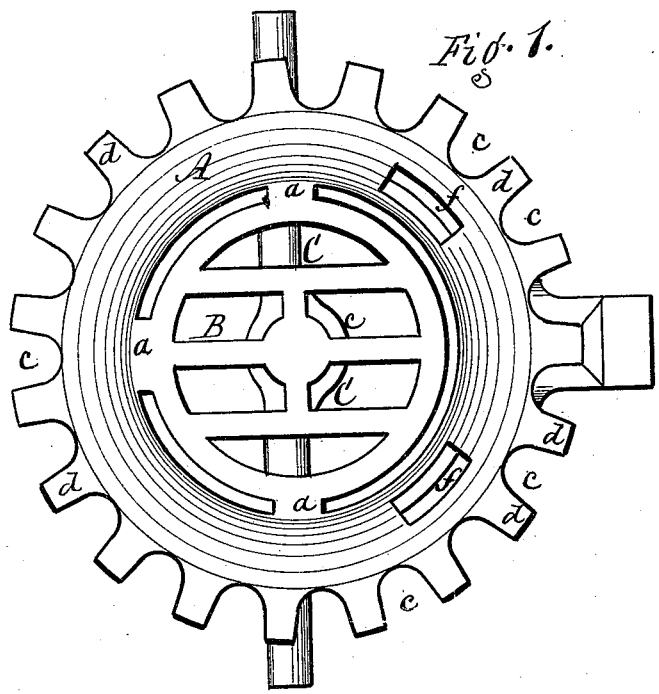
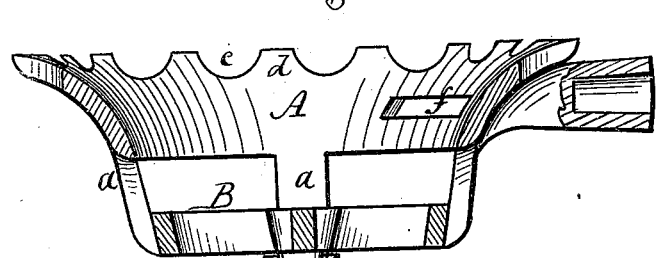
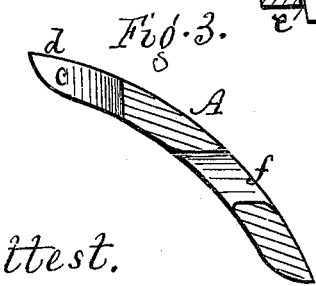
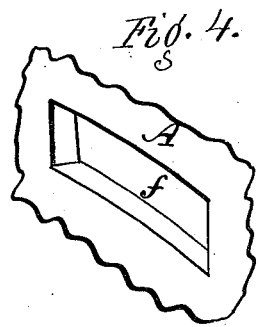
Attest.
Jacob Spahn
R. E. White
Inventor.
Wm B. Geddes,
per R. F. Osgood,
atty.

UNITED STATES PATENT OFFICE.

WILLIAM B. GEDDES, OF ROCHESTER, NEW YORK.

IMPROVEMENT IN STOVE AND FURNACE GRATES.

Specification forming part of Letters Patent No. 202,102, dated April 9, 1878; application filed July 14, 1877.

*To all whom it may concern:*

Be it known that I, WILLIAM B. GEDDES, of the city of Rochester, in the county of Monroe and State of New York, have invented a certain new and useful Improvement in Stove and Furnace Grates; and I do hereby declare that the following is a full, clear, and exact description of the construction and operation of the same, reference being had to the accompanying drawings, in which—

Figure 1 is a plan of the grate. Fig. 2 is a vertical section. Fig. 3 is a cross-section of the rim through one of the poke-holes of the grate, and Fig. 4 is a perspective view of the same.

My improvement relates to a grate having a sunken center.

The invention consists of a basket-grate composed of a rim and a sunken center, the said rim being made closed or imperforate, provided at its outer edge with notches and lugs of sufficient size to form a sifter at that point, and provided on the quarters and in front with small holes, through which a poker may be inserted to stir the fire, all as hereinafter described.

A represents the curved rim, and B the sunken center. These parts are connected by vertical bars $a\ a\ a$, in such a manner as to leave free space between the rim and the center for a poker to be inserted to remove ashes and clinker. The space in front, between the rim and center, is entirely open a half-circle, so as to present no obstruction in drawing out the contents. The center is simply a circle, grated as usual, and having a pintle, $b$, which rests in the socket $e$ of the cross-bar C, made of the curved form, to allow the dumping of the grate.

The rim A is a ring made curved, and inclining downward in cross-section, being closed over its whole surface, with the exception of the notches in the periphery and the poke-holes in its quarters. This curved surface has the constant tendency to throw the contents of the fire-pot inward upon the depressed center, by reason of their running down the incline as the ashes are removed beneath.

$c\ c$ are the notches formed in the outer edge of the rim, said notches being made at regular intervals apart, and leaving projecting arms or lugs $d\ d$.

The notches may be made of any desired form, but preferably scalloped or circular, as shown.

$f f$ are two poke-holes formed in the body of the curved rim in front, on the opposite sides of the center, and at such a distance apart as will allow a poker entered through the door of the ash-pit to be inserted therein and worked easily. The holes are made somewhat elongated in the circumferential direction.

As thus constructed, the upper rim works the contents of the fire-pot toward the center, where it falls on the depressed bottom, as before described; therefore the tendency is to heap the fuel toward the center. In addition to this, the notches and lugs $c\ d$ at the periphery of the rim act as a sifter to sift the ashes from the coal at the extreme circumference of the fire-pot—a point where the ashes constantly accumulate in ordinary grates, and which, owing to the closed form of such grates at the periphery, cannot readily be removed, but clog and deaden the fire, and cover a portion of the fire-pot, and prevent radiation therefrom. In this invention all such difficulties are overcome, for a very slight movement of the grate at any time is sufficient to sift out all the ashes at the periphery. By this means, also, the ashes may be allowed to accumulate in the center, so that the combustion is principally at the outside, the notches serving to feed the draft in at that point, thus economizing the combustion in the best manner. This effect can be secured only by making the rim A closed, in contradistinction to being open, as the accumulation of ashes in the depressed portion will seal the center, forcing the air to pass up around the outside.

The poke-holes $ff$ allow a poker to be inserted through the rim above the depressed center without disturbing the ashes resting in a body upon said center, by which means the body of fuel in the fire-pot may be stirred or shaken down if it becomes clogged, which otherwise could not be done without inserting the poker through the basket portion. These holes are so situated as to give a free range of motion of the poker through the whole body of the fire-pot.

It will be seen that by reason of the curved and bent shape of the cross-bar or yoke C, when the grate is dumped, the grate is thrown backward with the cross-bar, which opens a large and unobstructed space in front, allowing the contents to readily pass out, and facilitating the entrance of a poker to assist in removing the contents.

Having thus described my invention, I claim—

1. A basket-grate composed of the rim A and sunken center B, when said rim is made closed or imperforate, except the poke-holes $f f$ in front, and provided at its periphery with notches and lugs $c\ d$, of sufficient size to form sifters, as shown and described, and for the purpose specified.

2. In a basket-grate having a closed or imperforate rim, except the poke-holes $f f$ in front, the notches $c$ and lugs $d$, made of sufficient size to form a sifter at the periphery, as shown and described, and for the purpose specified.

In witness whereof I have hereunto signed my name in the presence of two subscribing witnesses.

WM. B. GEDDES.

Witnesses:
  R. F. OSGOOD,
  O. H. STEVENS.